F. MUNTZ.
PLOW ATTACHMENT.
APPLICATION FILED JULY 20, 1912.
1,073,434.
Patented Sept. 16, 1913.
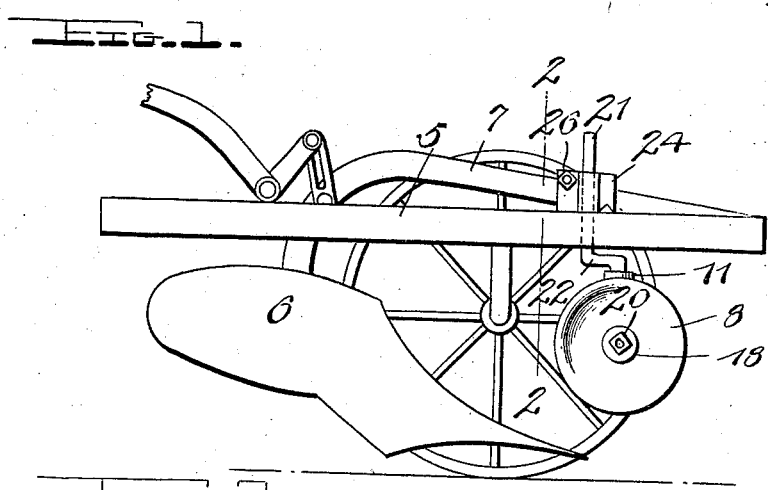
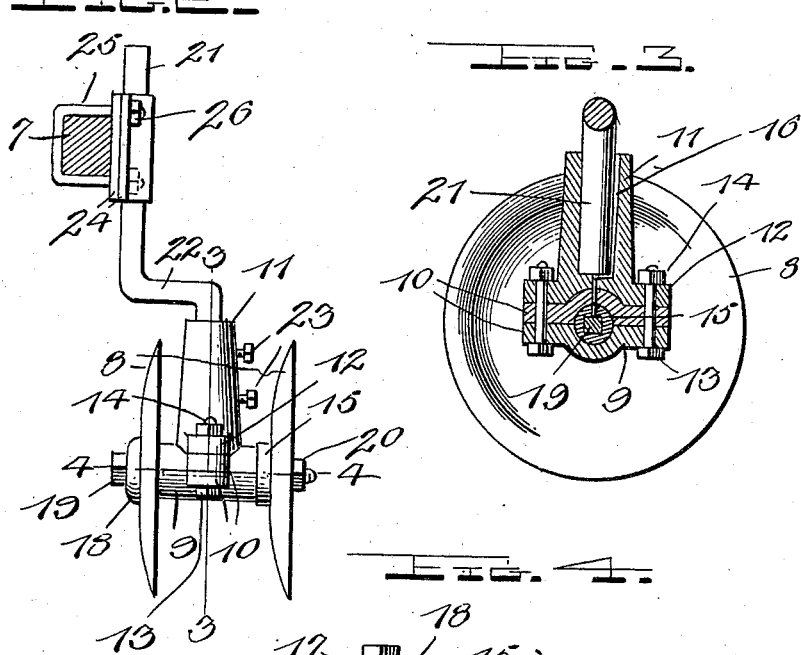
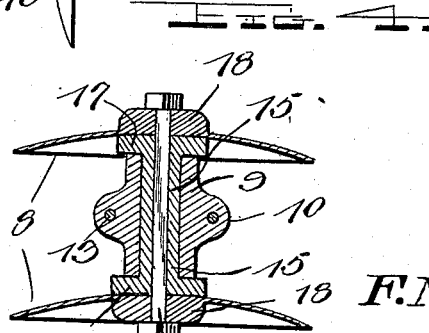
Witnesses
Chas. L. Griesbauer.
A. B. Norton.
Inventor
F. Muntz,
By Watson E. Coleman.
Attorney

UNITED STATES PATENT OFFICE.

FRANK MUNTZ, OF GREENFIELD, ILLINOIS.

PLOW ATTACHMENT.

1,073,434.  Specification of Letters Patent.  Patented Sept. 16, 1913.

Application filed July 20, 1912. Serial No. 710,645.

*To all whom it may concern:*

Be it known that I, FRANK MUNTZ, a citizen of the United States, residing at Greenfield, in the county of Greene and State of Illinois, have invented certain new and useful Improvements in Plow Attachments, of which the following is a specification, reference being had to the accompanying drawings.

This invention relates to improvements in plows and more particularly to a plow attachment consisting of spaced rotary disks to travel in front of the plow point and turn the top soil so that the lower or subsoil turned over by the plow point will be turned upon the loose top soil, thus leaving the ground loose and mellow to receive the seed so that it will require but little further cultivation.

Another object of the invention resides in the provision of a disk attachment for gang or sulky plows, said attachment comprising spaced disks disposed upon either side of the plow point and means for adjustably mounting the disks upon the plow beam whereby the same may be easily and quickly adjusted with relation to the plow point.

A still further object of the invention resides in the provision of a device of the above character which is simple and durable in construction, efficient and reliable in practical use and may be produced at comparatively small cost.

With the above and other objects in view, the invention consists in the novel features of construction and the combination and arrangement of parts hereinafter more fully described, pointed out in the claim and shown in the accompanying drawings in which, Figure 1 is a side elevation of a plow provided with my improved disk attachment. Fig. 2 is a section taken on the line 2—2 of Fig. 1. Fig. 3 is an enlarged section taken on the line 3—3 of Fig. 2, and Fig. 4 is a section taken on the line 4—4 of Fig. 2, illustrating the manner of mounting the disk carrying standard.

Referring in detail to the drawing, 5 designates a wheel supported frame in which the plow 6 is mounted, said plow being secured to the end of the usual beam 7. Any preferred means may be provided for adjusting the plow beam vertically to raise and lower the point of the plow so that it will enter the ground to the desired depth.

Upon the plow beam 7, my attachment is arranged, and this attachment comprises the spaced disks 8 which are preferably of concavo-convex form and may be provided with saw toothed or smooth edges, as preferred. Between the disks 8, the two part collar 9 is arranged, said collar sections being provided upon opposite sides with the ears 10. A cylindrical sleeve 11 is provided with a concave end to engage closely upon the periphery of one of the collar sections 9, said sleeve being provided at opposite points with ears 12. Through the ears 12 and the ears 10 of the collar sections, the bolts 13 are disposed and are provided upon one of their ends with nuts 14, whereby the sleeve 11 is rigidly held upon the collar.

Revolubly mounted within the collar 9 is a spool 15 which is provided with enlarged ends 17 engaging the ends of the collar sections 9. Secured in the spool 15, is a bolt 19, as clearly illustrated in Figs. 3 and 4, said bolt being square in cross section and secured at its ends in the hub portions 18 of the disks 8, whereby the spool, rod and disks will all turn together within the collar sections 9. One end of the rod 19 is provided with a head, while a nut 20 is threaded on the other end thereof. By adjusting this nut, the hubs of the disks 8 may be clamped against the ends of the spool 15, thereby securing the several elements together, while permitting of the free rotary movement of the disks.

Preferably, there is an oil groove 16 formed in the sleeve 11, as best illustrated in Fig. 3, said groove passing down into the collar sections, as shown.

A standard 21 is provided upon one end with a crank 22, and this crank end of the rod is adapted to be received in the sleeve 11. Set screws 23 are threaded in this sleeve for binding engagement with the rod to rigidly secure the sleeve thereon. The upper end of the rod 21 is adapted to be rigidly clamped upon the plow beam 6, and to this end, I provide the clamping plates 24 which are arranged upon one side of the beam and between which the standard 21 is received. These plates are provided with apertured ears to receive the ends of a U shaped clip bolt 25 which embraces the plow beam 6.

The ends of this bolt are threaded and provided with the usual clamping nuts 26 whereby the members 24 may be securely clamped together upon the standard 21. The rotary disks 8 may be easily and quickly adjusted at any desired angle with relation to the plow point or raised or lowered by loosening the nuts 26 and rotating the standard 21 or moving the same vertically between the clamping members 24. When it is desired to entirely remove the disks for any purpose, the same may be readily done by simply loosening the set screws 23 and disconnecting the sleeve 11 from the crank 22 of the standard 21.

From the foregoing, it is believed that the construction and manner of operation of my improved plow will be clearly understood.

It will be obvious that any desired number of the pairs of rotary disks can be employed in accordance with the size of the plow. They may be arranged in series in advance of the plow point and adjusted to different relative positions with relation to the ground surface so that they will successively cut or slice the soil in layers, thus only leaving the subsoil to be turned over by the plow. In this manner, the soil will be thoroughly loosened and placed in condition to receive the seed without necessitating its further preparation. Owing to the comparatively few elements employed in my improved disk attachment, it will be readily apparent that the entire device can be produced at small cost and is also extremely durable and reliable in use.

While I have shown and described the preferred construction and arrangement of the various elements, it will be understood that the invention is susceptible of considerable modification without departing from the essential features or sacrificing any of the advantages thereof.

What I claim is:—

The herein described journal bearing embodying a sleeve adapted for attachment to a supporting standard, a cylindrical bearing consisting of two separable sections each provided with oppositely projecting ears, said sleeve being closed at one end and provided with a concave seating face for engagement upon the upper bearing section and having integrally formed ears projecting from opposite sides of said concave face to lie in superposed relation to the ears of the bearing, and bolts extending through the ears of the bearing and sleeve to detachably secure the sleeve to the bearing and to connect the bearing sections to each other.

In testimony whereof I hereunto affix my signature in the presence of two witnesses.

FRANK MUNTZ.

Witnesses:
  RALPH METCALF,
  LEO SMITH.

---

Copies of this patent may be obtained for five cents each, by addressing the "Commissioner of Patents, Washington, D. C."